US008947182B2

(12) United States Patent
Ahlert et al.

(10) Patent No.: US 8,947,182 B2
(45) **Date of Patent: *Feb. 3, 2015**

(54) RELEASE FOR AN ELECTRICAL SWITCHING ARRANGEMENT

(75) Inventors: Torsten Ahlert, Fürstenwalde (DE); Marc Liebetruth, Glienicke (DE)

(73) Assignee: Siemens Aktiengesellschaft, Munich (DE)

( * ) Notice: Subject to any disclaimer, the term of this patent is extended or adjusted under 35 U.S.C. 154(b) by 82 days.

This patent is subject to a terminal disclaimer.

(21) Appl. No.: 13/492,018

(22) Filed: Jun. 8, 2012

(65) Prior Publication Data

US 2012/0314331 A1 Dec. 13, 2012

(30) Foreign Application Priority Data

Jun. 10, 2011 (DE) ......................... 10 2011 077 359

(51) Int. Cl.

| | |
|---|---|
| ***H01H 9/00*** | (2006.01) |
| ***H01H 9/30*** | (2006.01) |
| ***H02H 3/08*** | (2006.01) |
| ***H01H 71/12*** | (2006.01) |
| ***H01H 77/02*** | (2006.01) |
| *H01H 1/20* | (2006.01) |
| *H01H 9/34* | (2006.01) |
| *H01H 71/40* | (2006.01) |
| *H01H 71/24* | (2006.01) |

(52) U.S. Cl.

CPC ............... *H01H 71/12* (2013.01); *H01H 77/02* (2013.01); *H01H 1/2058* (2013.01); *H01H 9/342* (2013.01); *H01H 71/40* (2013.01); *H01H 2071/2427* (2013.01); *H01H 2077/025* (2013.01)

USPC ............................ 335/172; 335/201; 361/102

(58) Field of Classification Search

USPC .................. 335/172–176, 201; 361/102, 93.1

See application file for complete search history.

(56) References Cited

U.S. PATENT DOCUMENTS

| | | | | |
|---|---|---|---|---|
| 5,103,198 | A * | 4/1992 | Morel et al. | 335/6 |
| 6,281,458 | B1 * | 8/2001 | Castonguay et al. | 218/22 |
| 8,553,385 | B2 * | 10/2013 | Ahlert | 361/102 |
| 2001/0048354 | A1 | 12/2001 | Doma et al. | |
| 2005/0151607 | A1 * | 7/2005 | Li et al. | 335/132 |
| 2012/0026638 | A1 | 2/2012 | Ahlert | |

FOREIGN PATENT DOCUMENTS

| | | | |
|---|---|---|---|
| DE | 102009010900 | A1 | 9/2010 |
| DE | 102009015126 | A1 | 10/2010 |
| EP | 1266387 | B1 | 8/2007 |
| WO | WO 01/69630 | | 9/2001 |

OTHER PUBLICATIONS

German Office Action for German Patent Application No. 10 2011 077 359.2 dated Jan. 18, 2012.

* cited by examiner

*Primary Examiner* — Bernard Rojas

(74) *Attorney, Agent, or Firm* — Harness, Dickey & Pierce, P.L.C.

(57) ABSTRACT

A selective release with a moving element is disclosed. The moving element is here mounted such that the moving element, in addition to the motion about its swivel axis, is guided in its motion by way of a brace. As a result of this, the moving element is mounted such that the trajectory of the blocking element essentially runs in a plane which extends transversely to the direction of flow of the flow channel.

12 Claims, 8 Drawing Sheets

RELEASE FOR AN ELECTRICAL SWITCHING ARRANGEMENT

PRIORITY STATEMENT

The present application hereby claims priority under 35 U.S.C. §119 to German patent application number DE 10 2011 077 359.2 filed Jun. 10, 2011, the entire contents of which are hereby incorporated herein by reference.

FIELD

At least one embodiment of the invention generally relates to current-limiting switching arrangements in the low voltage range, i.e. up to approx. 1000 volts.

BACKGROUND

Current-limiting switching arrangements are designed in particular to interrupt current paths in the event of a short-circuit or an overcurrent. Furthermore, current-limiting switching arrangements can be designed to be single-pole or multi-pole, in particular three-pole. They can have one or more pairs of switching contacts per arc contact. In particular these electrical switching arrangements are designed to interrupt currents of more than 100 A, in particular of several kA.

Thus for example when using current-limiting switching devices, in particular current-limiting circuit-breakers for example in the form of MCCBs (Molded Case Circuit Breaker) in widely branched power distribution grids, selective gradings with a minimum rated current spacing of the relevant switching devices is normal. Each branching level can in this case be protected, as a function of the consumers connected, against overloads and short-circuits that occur, using a correspondingly dimensioned switching device.

In this case, for example, a switching device which is arranged closest to a consumer and which is often also referred to as a switching device which is close to or downstream of the consumer, is designed for the lowest rated current. If a short-circuit current now flows both through the switching device close to the consumer and also through a switching device that is arranged in the hierarchy of the power distribution grid above the device close to the consumer and is often also referred to as a switching device which is remote from or upstream of the consumer, only the switching device close to the consumer should now disconnect. In other words in the event of a fault (short-circuit) only the switching device which is closest to the event should interrupt the flow of current.

The pairs of switching contacts of the switching device which is close to and sometimes also of the switching device which is remote from the consumer draw an arc when opened, the width of opening of the pairs of switching contacts and also the arc power in the case of the switching device close to the consumer being higher because of the lower moment of inertia of its moving current path including the switching contacts. This opening, which is sometimes only single-pole, must be followed by an all-pole disconnection of the switching device close to the consumer. The switching device remote from the consumer must not disconnect, in order not to disconnect other consumers from the power distribution grid. The switching device remote from the consumer may however act in a supporting capacity by briefly disengaging the switching contacts, thus for example helping to disconnect the switching device close to the consumer by limiting the current.

Switching devices which work in this graded manner in power distribution grids behave selectively. To achieve this selectivity it is necessary that the switching devices located closest to the fault interrupt the current paths of all arc contacts and that the higher-level switching devices remain on the grid.

Generic releases and switching arrangements with releases of this type which are suitable for such selective interruption of current paths are known for example from DE 10 2009 015126 A1.

DE 10 2009 015126 A1 discloses a release for an electrical switching arrangement which is arranged over the course of a first current path and which has at least two switching contacts arranged in a housing which are isolated if the current flowing across the switching contacts has exceeded a particular threshold value, with an actuating element, which counter to the force of a restraining apparatus responds to a pressure which is generated by an arc drawn in the event of an electrodynamic recoil of the switching contacts in an isolating zone of the switching contacts surrounded by the housing, and which actuates a shutdown mechanism effecting the automatic interruption of the current path, the actuating element having a movable element which forms a blocking element in a flow channel connected to the isolating zone, which blocking element performs a predetermined control movement at the pressure which is intended to result in disconnection.

Generally in the case of selective releases it is necessary to ensure that they continue to work even after the contacts have opened several times. When contacts open this can lead to the formation of carbon black, metal condensate, metal beads and burn-off products of plastics. These substances can be deposited on the movable element of a selective release or in the vicinity thereof and hence impede its working.

The moving element of a selective release according to DE 10 2009 015126 A1 can be mounted in only one swivel axis, which moreover can be designed with clearance. As a result, if the contacts are opened by the pressure of the arcing gases it can happen that the moving element is likewise pressed in the direction of the flow and comes into contact with parts of the housing. This contact between a moving element and parts of the housing and the consequent friction between them can result in a failure or in an incorrect release of the selective release. The friction between the moving element and the parts of the housing can additionally be increased by contamination which arises as a result of the opening of the contacts.

SUMMARY

At least one embodiment of the invention specifies a selective release with a moving element which features improved functional reliability.

Advantageous embodiments are specified in the dependent claims.

According to at least one embodiment of the invention, the moving element is mounted such that the moving element, in addition to the motion about its swivel axis, is guided in its motion by means of a brace, as a result of which the moving element is mounted such that the trajectory of the blocking element essentially runs in a plane which extends transversely to the direction of flow of the flow channel.

BRIEF DESCRIPTION OF THE DRAWINGS

The invention and advantageous embodiments of the invention are described below on the basis of the following figures, which show.

Figure 1:
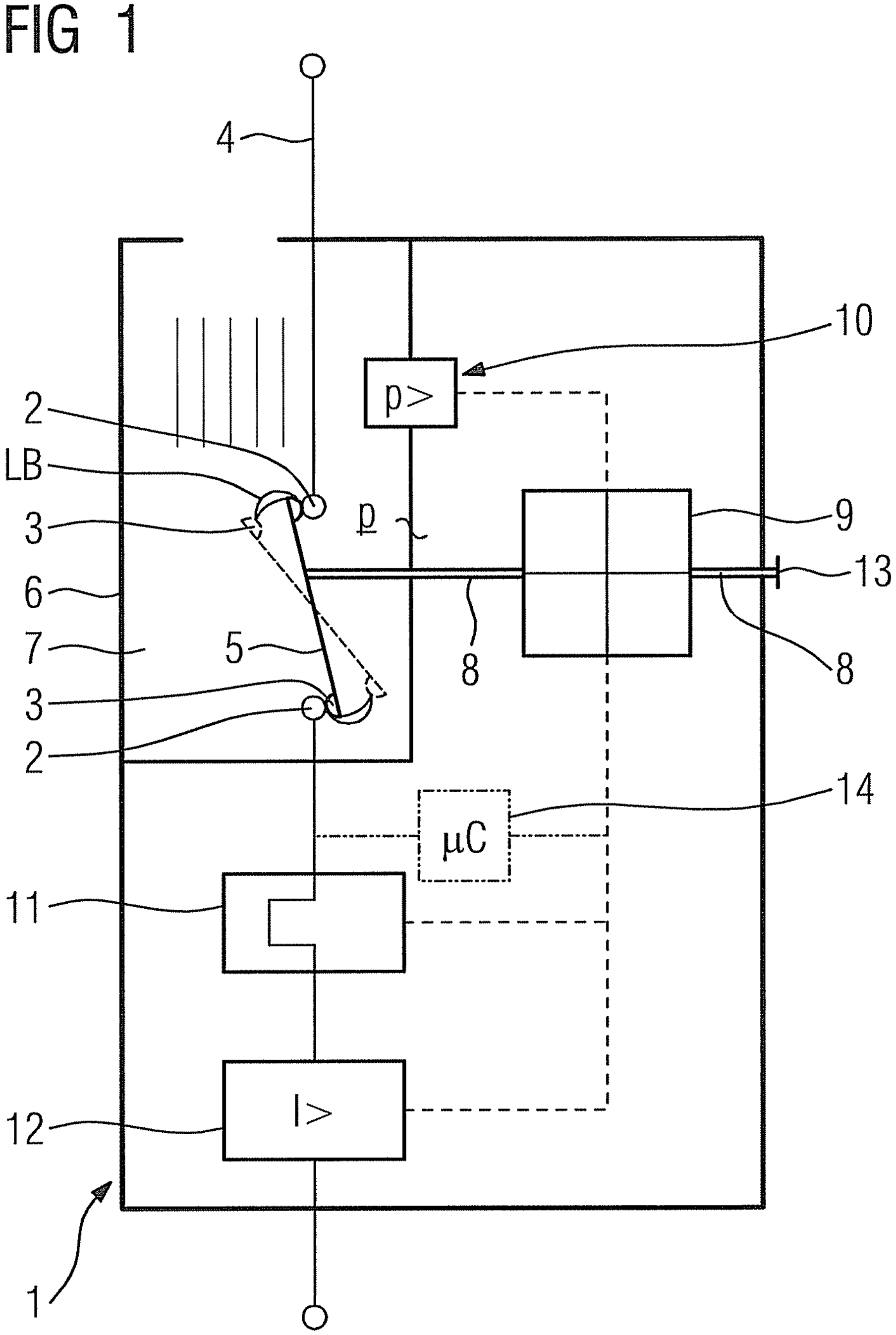
FIG. 1 shows a schematic illustration of an embodiment of an electrical switching arrangement with an inventive release as a pressure sensor element.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to at least one embodiment of the invention, the moving element is mounted such that the moving element, in addition to the motion about its swivel axis, is guided in its motion by means of a brace, as a result of which the moving element is mounted such that the trajectory of the blocking element essentially runs in a plane which extends transversely to the direction of flow of the flow channel.

It is advantageous here that where the main bearing point is designed to have particular clearance a trajectory of the selective release is enabled which provides articulated support for the brace in the direction of flow. This produces a type of two-point bearing, in which the blocking element of the moving element describes a trajectory in the flow channel, the theoretical axis of which approximately represents the connecting line of the two bearing points. The dual bearing is advantageous on the one hand thanks to the minimization of the friction forces, since as a result of the small friction radii the friction torques of both part-bearings are small compared to the drive torque of the moving element. On the other hand the second bearing can advantageously be positioned behind the shielding, so that no heavy contamination is to be expected.

The brace can be designed to be rod-shaped. The first end of the brace can be attached to the housing and the second end of the brace to the moving element.

The first end of the brace can be mounted on a part of the housing located in the direction of flow of the flow channel behind the moving element.

The release of at least one embodiment can interact with an electrical switching arrangement with at least two switching contacts arranged in a housing which are arranged over the course of a first current path and which can be isolated if the current flowing across the switching contacts has exceeded a particular threshold value.

FIG. 1 schematically shows an electrical switching arrangement 1 in the form of an individual electrical switching device (for example a low-voltage circuit-breaker) with two switching contacts 2, 3 for interrupting a first current path 4 of a first arc contact. A moving part 2 of the switching contacts is here supported by a rigid contact element 5.

The electrical switching device has a first switching center 7, delimited by a housing 6, for accommodating the switching contacts 2, 3 of the first current path. A drive mechanism 8 of the electrical switching device serves to open and close the switching contacts. Furthermore, the electrical switching device has a shutdown mechanism 9 in the form of a breaker latching mechanism arranged over the course of the drive mechanism 8 and a release 10 in the form of a pressure sensor element. In the first switching center 7 a pressure p is generated by an arc LB drawn in the event of an electrodynamic recoil of the switching contacts 2, 3, under the influence of which pressure the release 10 (the pressure sensor element) effects a release of the shutdown mechanism 9—in other words a disconnection of the latching of the breaker latching mechanism—in order to start up the drive mechanism 8 to open the switching contacts 2, 3. The pressure sensor element forms an energy-selective release (selective release), since the pressure p generated is essentially proportional to the energy of the arc LB drawn.

Also provided in the electrical switching device 1, besides the release 10 (as a pressure sensor element), are a thermal release 11 (as an overload sensor element), an electromagnetic release 12 (as a short-circuit sensor element) and a manual release 13, by means of which the breaker latching mechanism can be disconnected to open the switching contacts. An electronic release 14 (as an overload and/or short-circuit sensor element)—in other words an ETU (electronic trip unit)—can also be provided.

The electrical switching device 1 can, alongside the switching center 7 shown in FIG. 1, have further switching centers, in which switching contacts of further arc contacts are arranged.

Figure 3:
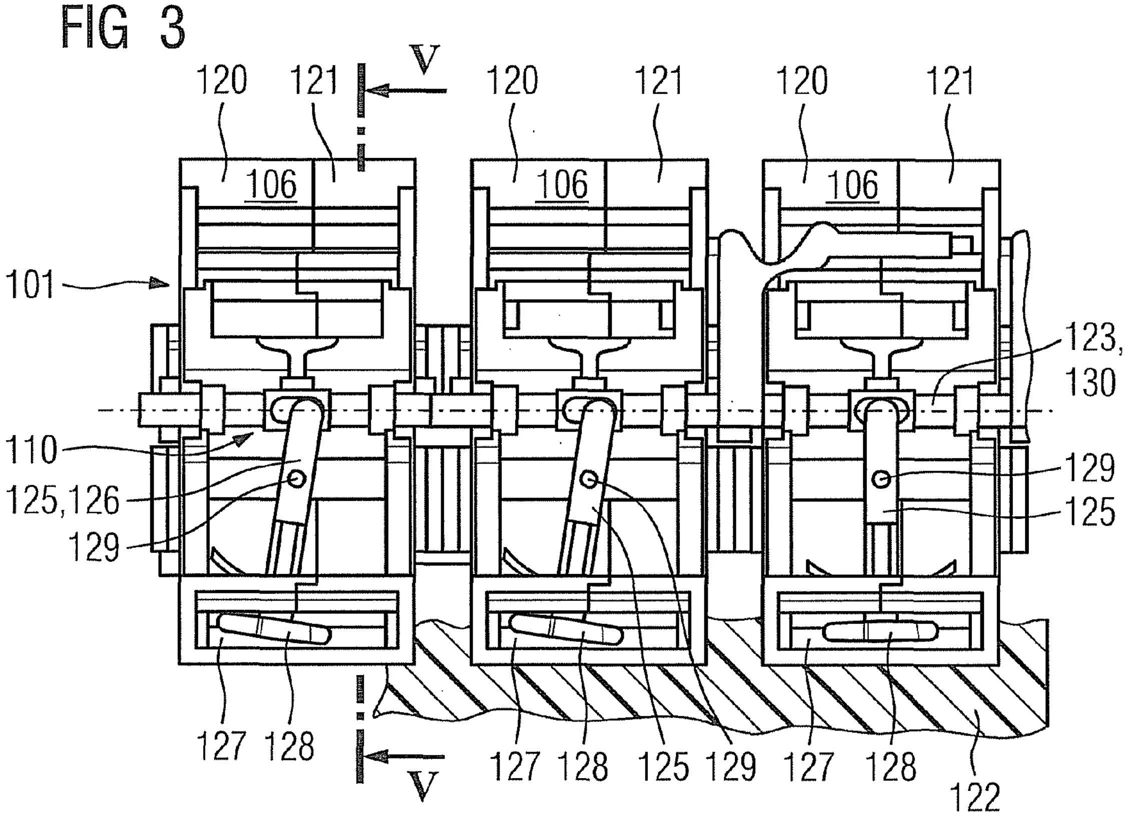
Figure 5:
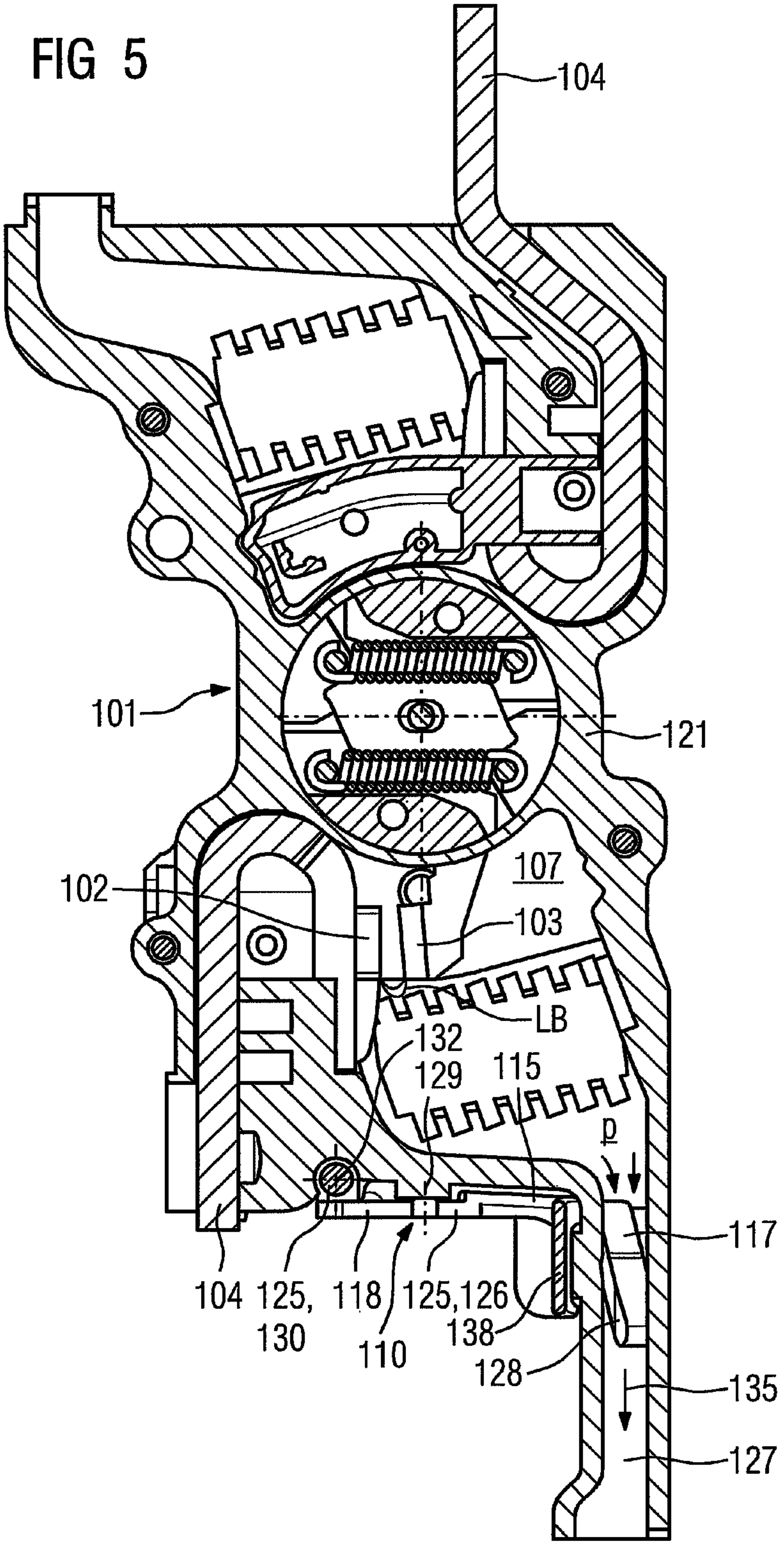

Thus FIG. 3 shows a first embodiment 101 of the electrical switching device, in which three housings 106 (also called field frames or switchgear units) are provided, each formed from two pole half-shells 120, 121, which in accordance with FIG. 5 each form a switching center 107 for accommodating the switching contacts 102, 103 of an arc contact.

According to FIG. 3 the three housings 106 are in this case inserted into a common enclosure 122 (breaker enclosure), which is here shown only in outline.

According to FIG. 5, which shows a detail in the section designated V-V in FIG. 3, the release 101 comprises an actuating element designated overall by 125, which responds to the pressure p generated in the isolating zone of the switching contacts 102, 103 by the arc LB drawn in the event of an electrodynamic recoil of the switching contacts. The actuating element 125 has a moving element 126 in the form of a two-arm lever which in a flow channel 127—here the blowout channel of the arc contact shown of the electrical switching device 101—which is connected to the isolating zone forms a blocking element 128 which performs a predetermined control movement at the pressure p which is intended to result in disconnection.

Figure 2:
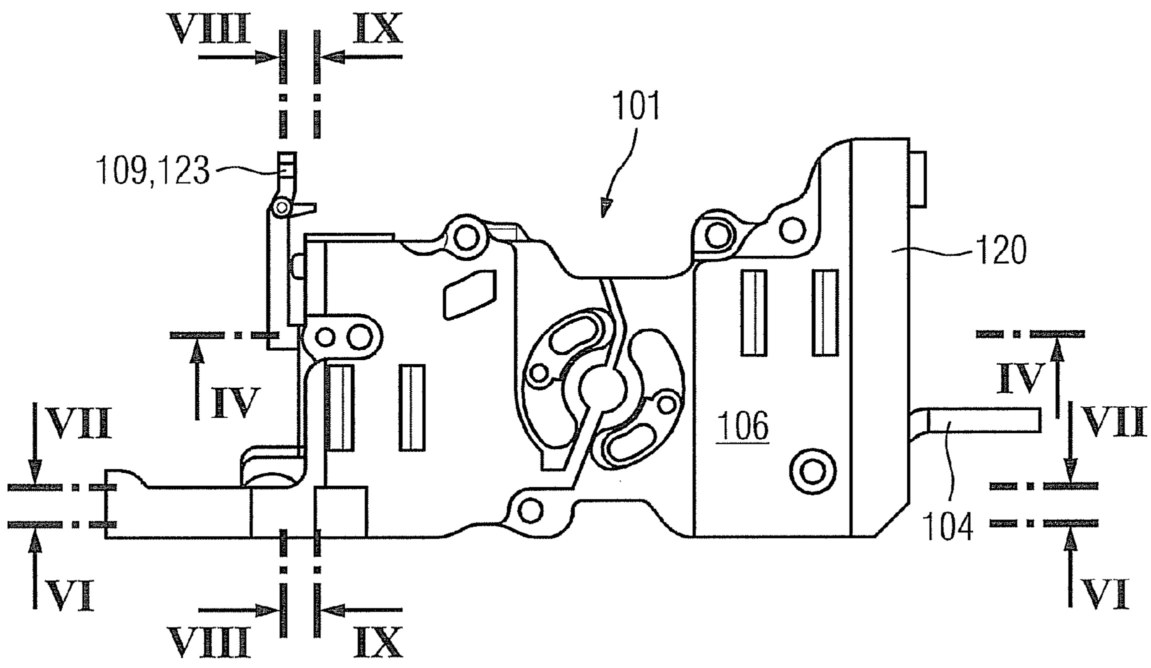
FIGS. 2 to 9 show an embodiment of an inventive electrical switching arrangement in the form of a current-limiting low-voltage circuit-breaker with an inventive release as a pressure sensor element, in which the moving element, which forms a blocking element in a flow channel connected to the isolating zone, can be rotated about an axis which runs parallel to the direction of flow.
Figure 6:
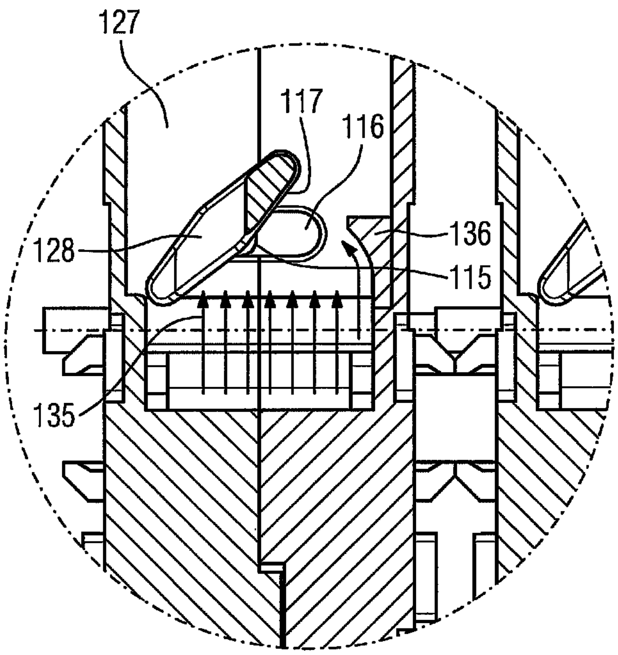
Figure 7:
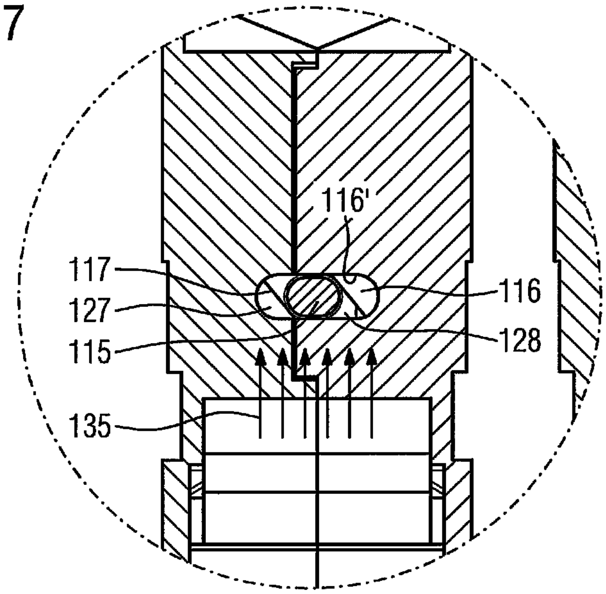

According to FIGS. 6 and 7, which show details in the sections designated VI-VI and VII-VII in FIG. 2, a first part 115, provided with the blocking element 128, of the lever arms of the moving element here projects through an opening 116 in the flow channel 127, the blocking element 128 (its flat contour 117) being arranged inclined at a particular angle (setting angle) toward the direction of flow 135.

As FIG. 6 also shows, shaped elements 136 for setting the dynamic pressure acting on the blocking element 128 can be provided in the flow channel.

Figure 9:
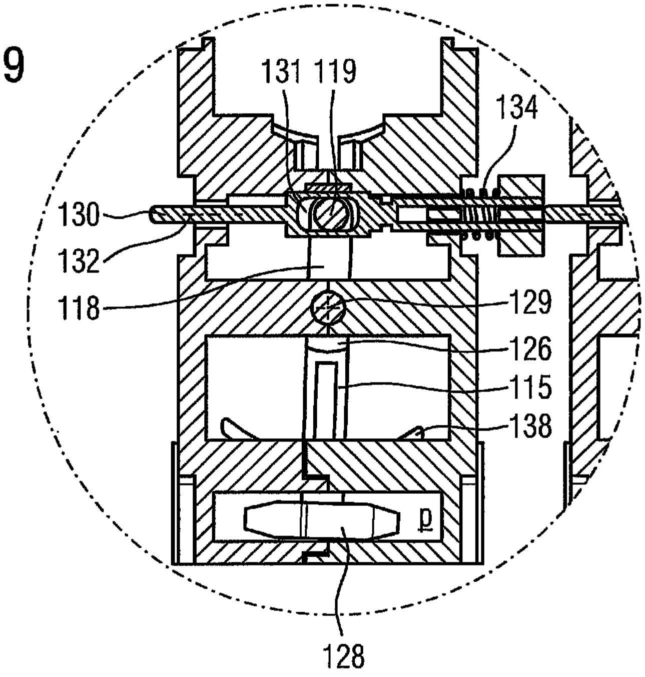

According to FIG. 9 the moving element 126, to the blocking element 128 of which the pressure p is applied, effects, by changing its position in the event of a predetermined control movement, here in the form of a predetermined swivel movement about its swivel axis 129, the release of the said shutdown mechanism by actuating an intermediate element 130 in the form of a collecting slider, with which, in accordance with FIG. 3, the moving elements 126 of the other arc contacts are also associated.

To this end a second part 118 of the lever arms of the moving element 126 engages into a longitudinal groove 131 of the intermediate element 130 with a peg 119 projecting in parallel to the swivel axis 129. The ends of the longitudinal grooves 131 of the intermediate element 130 (of the collecting slider) here at the same time form stops which delimit the trajectory (control path) of the moving elements.

The moving element 126 is here mounted via the swivel axis 129 running parallel to the direction of flow 135 such that the trajectory of its blocking element 128 essentially runs in a plane that extends transversely to the direction of flow 135 of the flow channel. As a result, by choosing an appropriate shape for the blocking element 128 and its setting angle in the flow channel 127 the pressure difference (acting transversely to the direction of flow 127 and resulting in the lifting of the blocking element 128) of the static portion of the gas pressure can also be used to set the switching point (of the release criterion) of the release, in addition to the dynamic portion of the gas pressure acting in the direction of flow 135, also called the "dynamic pressure".

Figure 4:
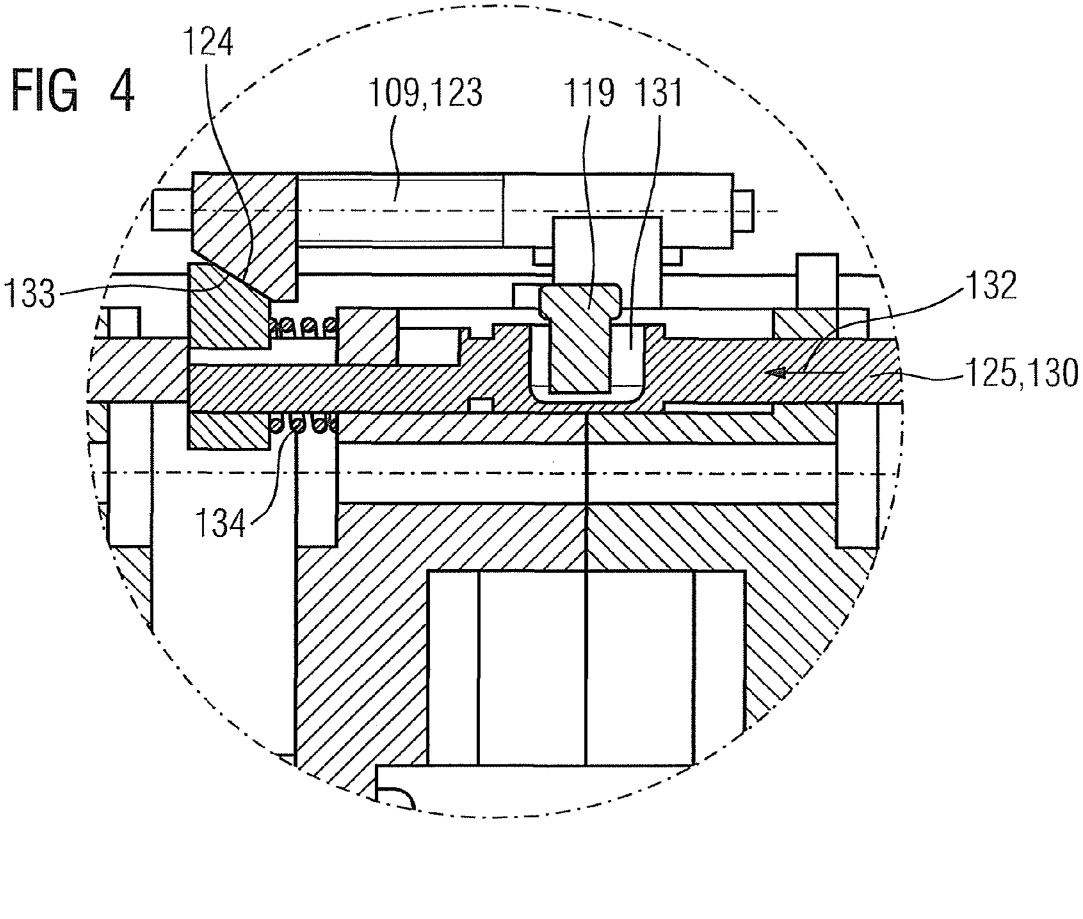

According to FIG. 4, which shows a detail in the section designated IV-IV in FIG. 2, the intermediate element 130 (the collecting slider) can be slid along an axis 132 which runs transversely to the direction of flow 135 or transversely to the swivel axis 129, and is operatively connected via a first inclined plane 133 to a release shaft 123 of the shutdown mechanism, the release shaft 123 having a second inclined plane 124 associated with the first inclined plane 133.

FIG. 4 also shows a restraining apparatus 134, which applies adjusted spring force to the moving elements directly via the collecting slider 130 (see also FIG. 9). The force of the restraining apparatus 134 is dimensioned such that an undesired release of the shutdown mechanism below the threshold value set for the achievement of the selectivity requirement is prevented.

Figure 8:
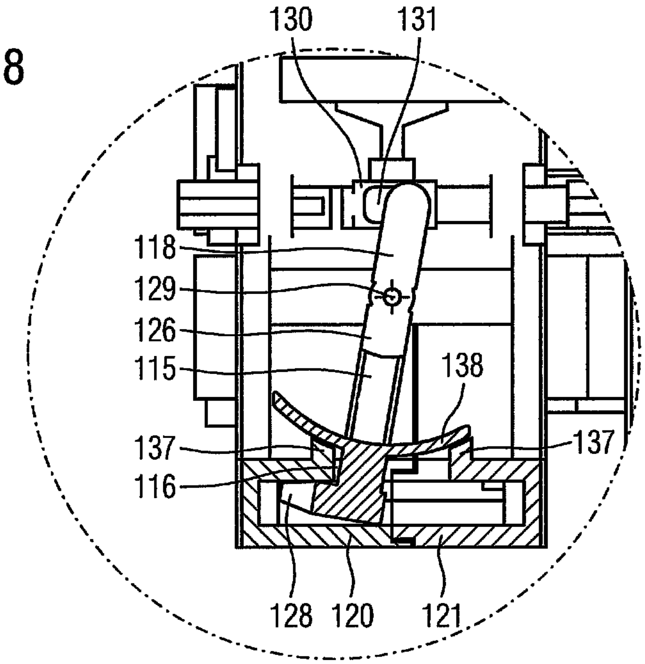

According to FIG. 8 the moving elements 126 and the intermediate element 130 are mounted on and between the pole half-shells 120, 121 such that no additional fastening elements are necessary. The intermediate element 130 is here composed of identically designed, connectable segments, the number of which corresponds to the number of poles. The spring system of the restraining apparatus 134 acting unilaterally on the intermediate element 130 forces the intermediate element 130 and all moving elements 126 into a defined starting position. Since the coupling points between the moving elements 126 and the intermediate element 130 are in each case effected by the engagement of one of the pegs 119 into one of the longitudinal grooves 131 and are consequently provided with a direction-specific trip-free mechanism, the swivel movement of one of the moving elements 126 of one of the arc contacts does not result in all other moving elements 126 being carried along at the same time.

Likewise the release shaft 123 can be designed as a single-part release slider 123 which without intermediate elements 130 directly connects the moving elements 126 of the individual poles to one another by means of coupling points between the moving elements 126 and the release slider 123, in each case by the engagement of one of the pegs 119 into one of the longitudinal grooves 131.

FIG. 8 also shows that the moving element is provided with a shield 138 bent so as to correspond to the wall surface 137 and opposing the wall surface for sealing the opening 116 of the wall surface 137 of the flow channel penetrated by the moving element, which wall surface has an arc-shaped cross-section bent about the swivel axis 129.

The inventive release 110 uses the gases flowing in the blowout channel after a disconnection operation to accept an energy-selective release criterion in the form of the swivel movement of the moving element 126, which then leads via the translatorily displaceable intermediate element 130 to the release/disconnection of the electrical switching arrangement 1 (of the low-voltage circuit-breaker). Both the angle (setting angle) and the external design (in particular the contour 117) of the blocking element are fluidically optimized such that a deflection is generated which is as reproducible as possible and which is equivalent to the flow.

Thus both the resistance which the blocking element (in particular the contour 117) exerts against the flow and the lift generated by the flow around the blocking element can be variably combined. Additionally the blowout channel can be geometrically created by the shaped elements 136 such that the gas flow optimally impacts on the flat contour 117 of the blocking element or optimally flows around the blocking element.

The inventive release of at least one embodiment is easy to mount in and on the pole half-shells 120, 121 of the housing 106.

Because the second lever arm 118 is designed to be longer than the first lever arm 115, the inventive release also enables the acceptance of a large control movement for actuating the shutdown mechanism.

Figure 10:
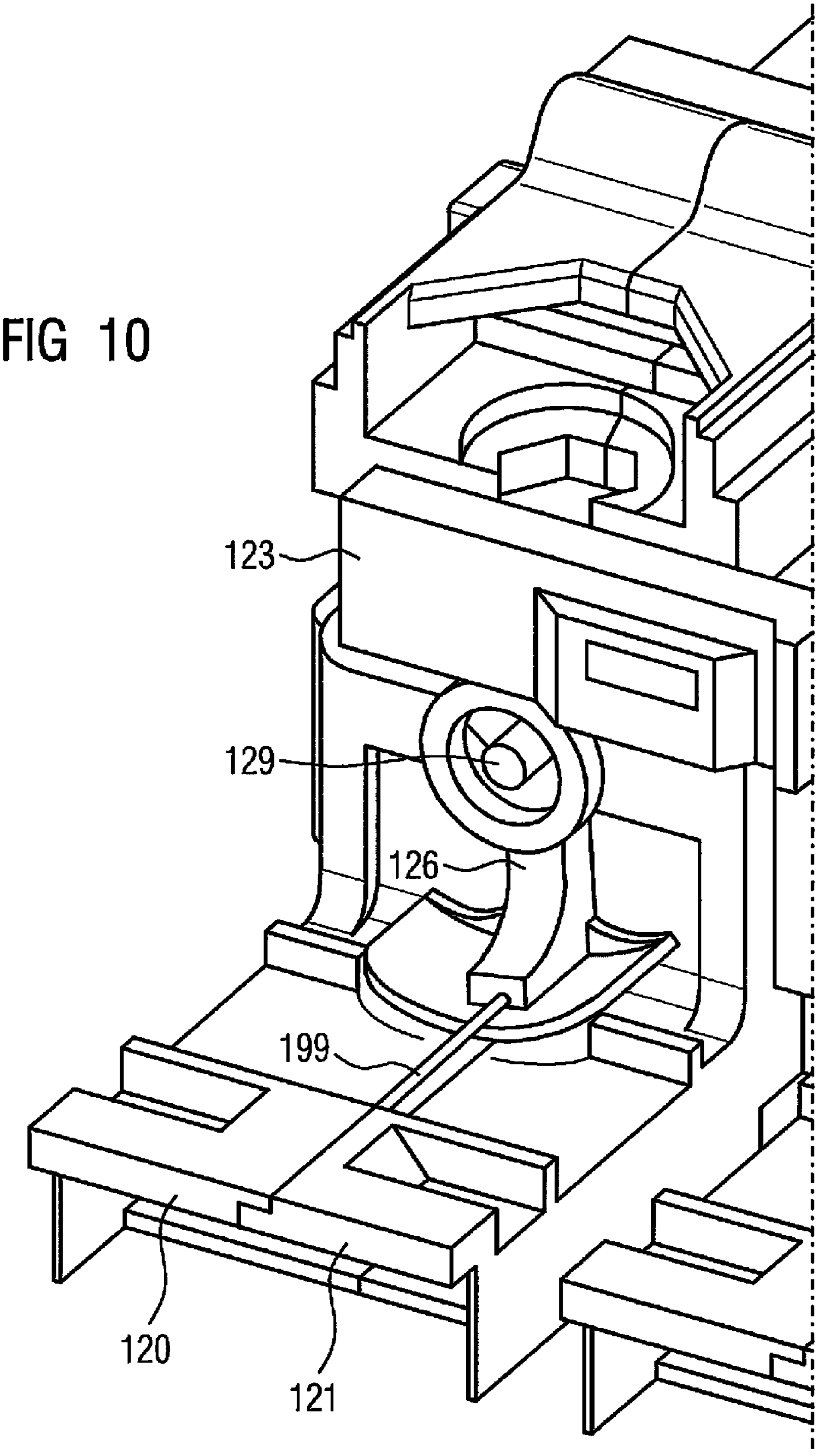
FIGS. 10 and 11 show an embodiment of an inventive release as a pressure sensor element, in which the moving element is guided in its motion by means of a brace and thanks to the brace is mounted such that the trajectory of its blocking element essentially runs in a plane which extends transversely to the direction of flow of the flow channel.
Figure 11:
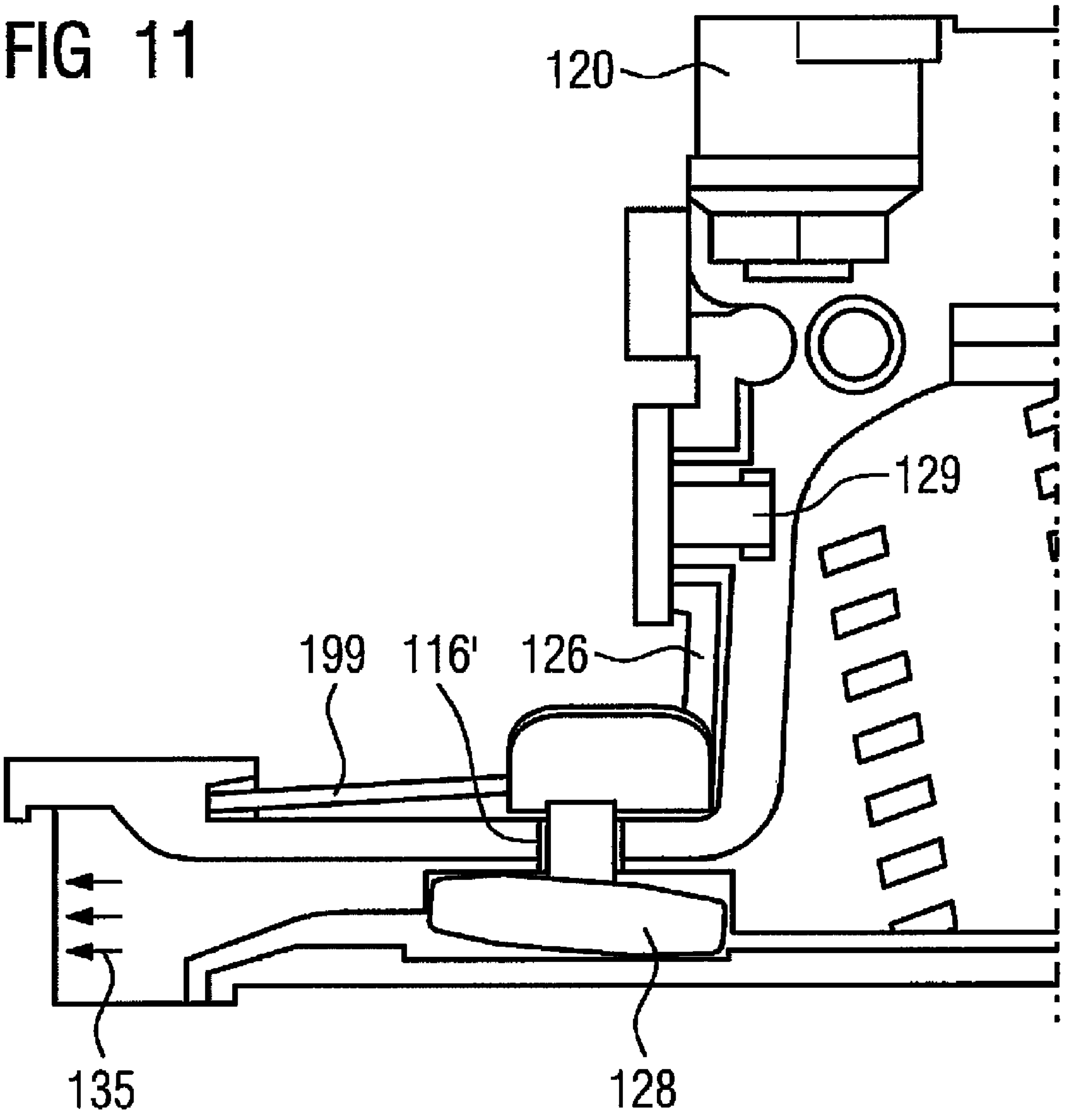

In FIGS. 10 and 11 the inventive release 10, 110 is shown as a pressure sensor element, in which the moving element 126 is guided in its motion by means of a brace 199 and thanks to the brace 199 is mounted such that the trajectory of the blocking element 128 runs essentially in a plane which extends transversely to the direction of flow 135 of the flow channel 127.

FIG. 10 shows the moving element 126 of the selective release. The moving element 126 is mounted on a main bearing point about its swivel axis 129. This mounting can have clearance. Typically the main bearing of the swivel axis 129 is formed by recesses (not shown in FIG. 10) in the two pole half-shells 120, 121. The moving element 126 is, in addition to the motion about its swivel axis 129, guided in its motion by means of a brace 199. This additional guidance by the brace 199 means that the trajectory of the blocking element 128 of the moving element 126 runs essentially in a plane which extends transversely to the direction of flow 135 of the flow channel 127.

If a contact opens the pressure of the arcing gases results in a flow corresponding to the direction of flow 135. This direction of flow 135 is likewise shown in FIG. 7. If the moving element 126 is mounted with clearance in its swivel axis 129 the moving element 126 is for example pressed against the part of the opening 116 which lies downstream in the direction of flow 135 and is designated in FIG. 7 by 116'. Because of the mechanical contact of the moving element 126 with the pole half-shells 120, 121, for example at a part 116' of the opening 116, the operation of the selective release is not ensured. The brace 199 prevents this mechanical contact.

FIG. 11 shows a side view of the release. The moving element 126 shown has a blocking element 128 and is rotatably mounted about its swivel axis 129. If the selective release is released, the flow of the gas along the direction of flow 135 presses the moving element 126 against the part 116' of the opening 116 lying downstream in the direction of flow. The brace 199 prevents the mechanical contact of the moving element 126 with one of the pole half-shells 120, 121.

The brace 199 can be designed to be rod-shaped. Furthermore, a first end of the brace 199 can be attached to the housing 6, 106, and a second end of the brace 199 to the moving element 126. In particular the first end of the brace 199 can be attached to one of the pole half-shells 120, 121. The first end of the brace 199 can be mounted on a part of the housing 6, 106, this part being located in the direction of flow 135 of the flow channel 127 behind the moving element 126. As a result it is ensured that the brace 199 supports the motion of the moving element 126 in the direction of force.

The inventive release 10, 110 of at least one embodiment can be part of an electrical switching arrangement 1, 101. This electrical switching arrangement 1, 101 can comprise at least two switching contacts 2; 102, 3; 103 arranged in a housing 6, 106, which are arranged over the course of a first current path 4, 104 and can be isolated if the current flowing across the switching contacts has exceeded a particular threshold value.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims.

Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A release for an electrical switching arrangement, arranged over a course of a current path, the electrical switching arrangement including at least two switching contacts arranged in a housing, the at least two switching contacts being isolated upon a current flowing across the at least two switching contacts exceeding a threshold value, the release comprising:

an actuating element configured to, respond, counter to a force of a restraining apparatus, to a gas pressure generated by an electric arc struck in an event of an electrodynamic recoil of the at least two switching contacts in an isolating zone of the at least two switching contacts, the isolating zone being surrounded by the housing, and actuate a shutdown mechanism effecting automatic interruption of the current path, the actuating element including, a moving element with a swivel axis, the moving element including a blocking element in a flow channel connected to the isolating zone, the blocking element being configured to perform a control movement in the presence of the pressure to result in disconnection, the moving element, being guided by way of a brace, the moving element being mounted such that a trajectory of the blocking element essentially runs in a plane that extends transversely to a direction of gas flow in the flow channel.

2. The release of claim 1, wherein the brace is designed to be rod-shaped.

3. The release of claim 1, wherein a first end of the brace is attached to the housing and a second end of the brace is attached to the moving element.

4. The release of claim 3, wherein the first end of the brace is mounted on a part of the housing which is located in the direction of gas flow in the flow channel behind the moving element.

5. An electrical switching arrangement comprising:

at least two switching contacts arranged in a housing, the at least two switching contacts being arranged over a course of a current path and being isolated upon a current flowing across the at least two switching contacts exceeding a threshold value; and the release of claim 1, configured to interrupt the first current path.

6. The release of claim 2, wherein a first end of the brace is attached to the housing and a second end of the brace is attached to the moving element.

7. The release of claim 6, wherein the first end of the brace is mounted on a part of the housing which is located in the direction of gas flow in the flow channel behind the moving element.

8. An electrical switching arrangement comprising:

at least two switching contacts arranged in a housing, the at least two switching contacts being arranged over a course of a current path and being isolated upon a current flowing across the at least two switching contacts exceeding a threshold value; and the release of claim 2, configured to interrupt the current path.

9. An electrical switching arrangement comprising:

at least two switching contacts arranged in a housing, the at least two switching contacts being arranged over a course of a current path and being isolated upon a current flowing across the at least two switching contacts exceeding a threshold value; and the release of claim 3, configured to interrupt the current path.

10. An electrical switching arrangement comprising:

at least two switching contacts arranged in a housing, the at least two switching contacts being arranged over a course of a current path and being isolated upon a current flowing across the at least two switching contacts exceeding a threshold value; and the release of claim 4, configured to interrupt the current path.

11. An electrical switching arrangement comprising:

at least two switching contacts arranged in a housing, the at least two switching contacts being arranged over a course of a current path and being isolated upon a current flowing across the at least two switching contacts exceeding a threshold value; and the release of claim 6, configured to interrupt the first-current path.

12. An electrical switching arrangement comprising;

at least two switching contacts arranged in a housing, the at least two switching contacts being arranged over a course of a current path and being isolated upon a current flowing across the at least two switching contacts exceeding a threshold value; and the release of claim 7, configured to interrupt the current path.

* * * * *